April 23, 1963 N. CAPELLARO 3,086,701

COMPUTER KEYBOARD

Original Filed July 20, 1953 2 Sheets-Sheet 1

INVENTOR:
NATALE CAPELLARO
BY: NOLTE AND NOLTE
ATTORNEYS

April 23, 1963 N. CAPELLARO 3,086,701

COMPUTER KEYBOARD

Original Filed July 20, 1953 2 Sheets-Sheet 2

INVENTOR:
NATALE CAPELLARO
BY: NOLTE AND NOLTE
ATTORNEYS

United States Patent Office 3,086,701

Patented Apr. 23, 1963

3,086,701

COMPUTER KEYBOARD

Natale Capellaro, Ivrea, Italy, assignor to Ing. C. Olivetti & C., S.p.A., Ivrea, Italy Original application July 20, 1953, Ser. No. 369,059, now Patent No. 3,029,014, dated Apr. 10, 1962. Divided and this application Oct. 31, 1961, Ser. No. 148,876
Claims priority, application Italy Aug. 1, 1952
1 Claim. (Cl. 235—60.32)

This case is a division of application No. 369,059, now Patent No. 3,029,014, dated April 10, 1962, and relates to duplex computing machines. More particularly, this invention relates to a keyboard for use with computing machines having first and second registers wherein simultaneous transfer operations between said registers may be readily effected.

Present day computing machines employ registers to store information on which it is desired to operate, and to store the results of previous operations. Frequently, to increase the flexibility and/or the storage capacity of the machine, more than one register is used. When two such storage registers are used, the machine is referred to as a duplex computing machine.

In the use of duplex computing machines, it is conventional to perform the following operations: (*a*) Entering amounts into either register. (*b*) Taking totals from either register. (*c*) Transferring total (or subtotals) from one register into the other register.

Conventional function control keyboards of duplex computing machines provide different types of function control keys, i.e. adding and subtracting keys, total and subtotal keys, and sometimes, register selecting keys. The problems involved in manipulating the keyboard have retarded the achievement of higher speed duplex computing machines, because it is frequently necessary for an operator, desiring to perform the above operations, to simultaneously depress two function control keys variably spaced from each other. Since the operator must use two fingers for such a depression, the manipulation has been heretofore relatively intricate and slow.

Accordingly, it is an object of this invention to increase the potential operating speed of duplex computing machines.

It is a further object of this invention to provide a function control keyboard for duplex computing machines which is easier to operate than prior art keyboards.

Another object of the invention is to provide a function control keyboard wherein an operator may simultaneously perform operations involving both registers with only one finger.

The invention accomplishes these objectives by rearranging the conventional function control keys which provide control of the operations listed above, in two groups of keys, each group comprising the amount-entering keys for one register and the total-taking keys for the other register. The grouped keys are closely juxtaposed for enabling simultaneous depression of two keys, corresponding to different registers, by means of a single finger to provide control of the above operations.

Figures 1, 3:
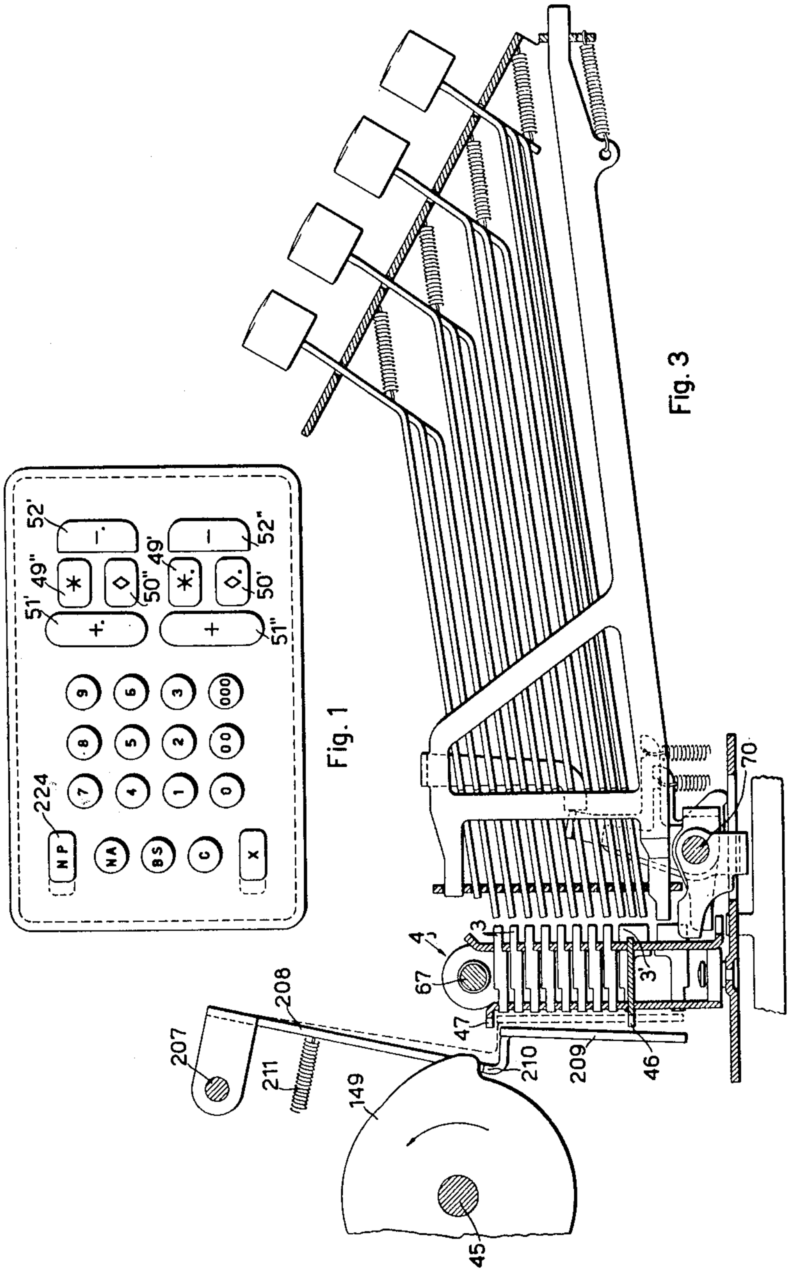
FIG. 1 is a plan view of a keyboard according to the invention.
FIG. 3 is a partial longitudinal sectional view through the machine.

Referring now to FIG. 1, there is illustrated a plan view of the function control keyboard in accordance with the principles of the invention. The left side of the keyboard (the amount-entering keys) is conventional and need not be described. Referring to the function control keys on the right hand side of the keyboard, keys 51′ and 51″ are used to initiate the adding operation of the first and second registers, respectively. Keys 52′ and 52″ relate to the subtracting operation, keys 49′ and 49″ are the total keys, and keys 50′ and 50″ are the sub total keys. In each case, the notation (′) relates to the first register, while the notation (″) relates to the second register. Depression of any of these keys causes functions similar to those that occur in the conventional computing machines, as will be described below with reference to FIGURES 2–4.

As shown in FIGURE 1, the adding key 51′ and the subtracting key 52′ for the first register, are grouped together with the second register total key 49″ and subtotal key 50″. Similarly, the adding key 51″ and the subtracting key 52″ for the second register are grouped together with the first register total key 49′ and subtotal key 50′. As shown, the amount-entering keys 51 and 52 are elongated while the function control keys 49 and 50 are relatively short. The keys are placed relatively close together, and, because of the manner in which they are arranged, their relative size and spacing, it is possible to press the amount entering key for one register and a function control key for the other register with a single finger. Thus, if it were desired to enter a sum into the first register and take the total of the digits stored in the second register, the operator would press elongated bar 51′, adjacent to function control key 49″, in such a manner as to simultaneously depress both keys causing the simultaneous initiation of the corresponding operations.

With the illustrated arrangement of FIG. 1, eight different arrangements of the function control keys (51′—49″, 51′—50″, 52′—49″, 52′—50″, 51″—49′, 51″—50′, 52″—49′ and 52″—50′) may be simultaneously depressed by means of a single finger in order to control the related eight different total transfer operations into (or out of) either register. Moreover, each key is individually depressible, as usual, to separately control its corresponding function when desired.

*General Description*

The invention is here disclosed as embodied in a computing machine of the well known ten-key keyboard type. Nevertheless, the invention may be applied also to other types of computing machines, such as the full keyboard type.

Figures 2, 4:
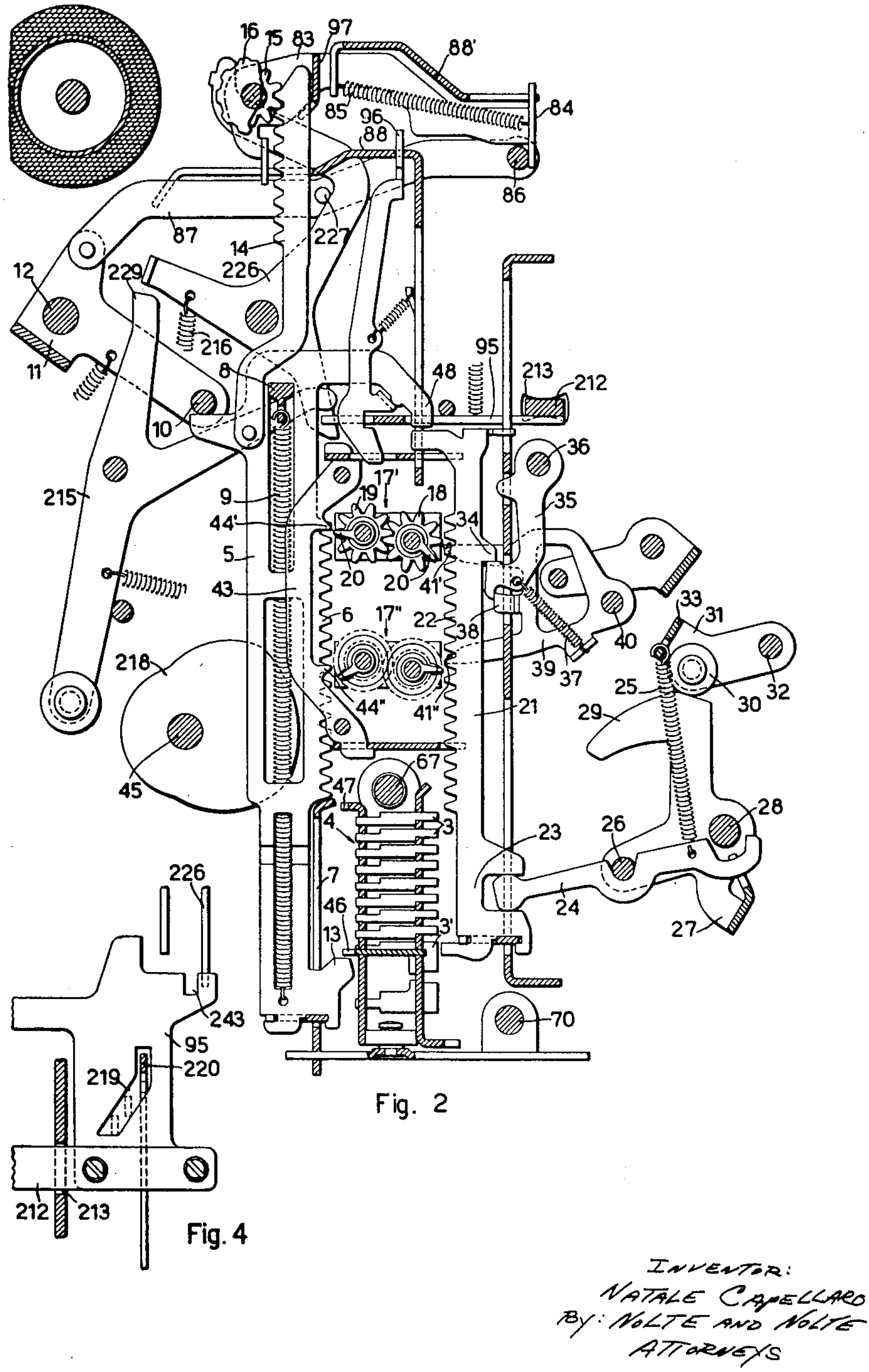
FIG. 2 is a longitudinal section view through a machine embodying the invention.
FIG. 4 is a partial plan view of a detail of the machine.

As will be seen from FIG. 2, the machine contains the usual pin carriage 4, movable transversely on a fixed shaft 67 and carrying rows of pins 3 and 3′ adapted to be shifted to the left of FIG. 1, in a known manner not to be described, by the digit keys of the invention as shown in FIGS. 1 and 3.

On the left hand side of the pin carriage 4 is arranged a set of slides 5, each slide 5 being provided with rack teeth 6 for engaging a corresponding pinion of a register to be hereinafter described. The slides 5 are vertically movable in a slotted fixed frame 7 and are guided by a fixed bar 8. Each slide 5 is urged upwardly by a spring 9. A restoring bar 10, carried by a restoring bail 11 secured to a shaft 12, normally holds all the slides 5 in their lowest position.

Each slide is provided with a projection 13 on which the pins of the pin carriage 4 may act as stops.

More particularly, the pins 3′ act as zero stops, the eight rows of pins 3 act as stops for the digits from 1 to 8 and the teeth of a comb 47, protruding from the frame of the pin carriage 4, act as stops for the digit 9. A comb 46 acts as zero stop for the slides 5 of the higher orders, as is known in the art.

Each slide 5 is associated with a type carrier 16 to be described later.

A register 17' is arranged on the right hand side of the slides 5. In the present example this register is of the well known type comprising two sets of pinions, designated as 18 and 19, which are in constant mesh with each other and which are supported by a suitable cradle. Each pinion has ten teeth and moreover a transfer tooth such as the tooth 20.

On the right hand side of the register is arranged a set of actuators 21, one actuator being provided for each order of the register and, therefore, for each slide 5. Each actuator 21 has rack teeth 22 for actuating the register pinions and is formed at its lower end with a fork 23 engaging an arm 24. Each arm 24 is urged counterclockwise about its pivotal connection with the fork 23 and is normally restrained in the position of FIG. 2 by a restoring bar 26 carried by a bail 27 secured to a shaft 28.

The bail 27 is formed with a cam shaped arm 29 on which rests a roller 30 pivoted on a bail 31. The bail 31 is loosely mounted upon a shaft 32 and is urged counterclockwise by the springs 25 secured to its transverse bar 33.

Normally, the springs 25 urge the arms 24 to rotate counterclockwise about bar 26 whereby the actuators 21 are urged downwardly.

In the position of FIG. 2 the downward movement of each actuator 21 is arrested by a transfer trip lever 35 cooperating with an abutment 34 of the actuator. Each transfer trip lever 35 is loosely mounted upon a shaft 36 and is urged to rotate in a counterclockwise direction by a spring 37. In the position of FIG. 2, the transfer trip lever 35 is latched by a bent-over lug 38 of a lever 39 pivoted at 40 and urged in a clockwise direction by the spring 37 attached thereto. Each lever 39 is provided with a pawl 41' which is engageable by the transfer tooth 20 of either pinions 18 and 19 of the next lower order of the register 17'.

On the left hand side of the register is provided a set of fixed stop plates 43, each having a stop lug 44' for arresting the transfer tooth 20 of either pinions 18 and 19 of the register in total taking.

Shaft 45, FIG. 1, designates the main operating shaft of the machine. As is well known in the art, this shaft makes a full rotation at each cycle of the machine and by known means, not to be described, imparts first a forward and then a return stroke to both shafts 12 and 28 at each cycle of the machine. More particularly, shaft 12 rocks first counterclockwise and then clockwise and shaft 28 rocks first clockwise and then counterclockwise.

*Addition*

Assume now that an amount has been set into the pin carriage 4 and that, by hand or by motor drive, an operating cycle is started. Shaft 12 initiates its counterclockwise rotation and the restoring bar 10 is lifted. The slides 5 are drawn upwardly by the springs 9 until arrested by the projected pins of the pin carriage in the manner described hereinabove.

The movement of the slides 5 is transmitted to the type carriers 16 hereinafter described.

At the same time as shaft 12, the shaft 28 initiates its clockwise rotation. During the first few degrees of this rotation the arms 24 are permitted by the bar 26 to rotate counterclockwise around their upper contact point with the corresponding forks, 23, until they contact the shaft 28. During the further rotation of shaft 28, the arms 24 are rotated clockwise around the shaft 28 by their spring 25, thereby lifting the actuators 21. Each actuator 21 moves until arrested by an arm 48 projecting from the corresponding slide 5.

It will thus be apparent that at the end of the forward stroke the elements of each pair of elements 5, 21 move both the same distance, said distance being determined by the corresponding digit set into the pin carriage 4.

The amount represented by the type carriers 16 is then printed, as will be hereinafter described, and the register 17' is shifted to the right, whereby the adding pinions 18 are put into engagement with the actuators 21 in a known manner.

During the return stroke of the shafts 12 and 28 the slides 5 and the actuators 21 are restored to their initial position, whereby the amount represented by the actuators 21 is entered into the register engaging therewith. Thereupon the register is disengaged from the actuators, as is known in the art, and it resumes its central inactive position of FIG. 2. The register engaging and disengaging mechanism may be of a known type and will not be described.

It may be observed that, due to the actuator 21 stopping against the slide 5 shortly after the stoppage of the slide 5 by the pin of the pin carriage, as hereinbefore described, the actuator 21 acts as a locking member for the slide 5, thus reducing any substantial rebounding thereof.

It may also be observed that, owing to the beam-like construction of the arms 24, each spring 25 serves two purposes, firstly of urging the actuators 21 downwardly from the position of FIG. 2 for purposes of transfer and secondly, after several degrees of clockwise rotation of shaft 28, of urging the actuators 21 upwardly for purposes of actuation. More particularly, if during the downward stroke of actuator 21 the transfer tooth 20 of the register wheel, engaging therewith, abuts against the transfer pawl 41', the latter is rocked counterclockwise, whereby its bent-over lug 38 releases the transfer trip lever 35 cooperating with the abutment 34 of the actuator 21 of the next higher order. The lever 35 is thus rocked counterclockwise by the spring 37, whereby upon completion of the downward stroke of the actuator 21 the abutment 34 is clear of the lever 35 and the actuator is urged by the spring 25 to move one additional step downwards beyond the position shown in FIG. 2. Thus, in accomplishing the first purpose, i.e. that of urging the actuator during the transfer operation, the spring 25 has the same function as the spring normally stretched between each differential member and the corresponding actuator, connected by a pin and slot as is known in the art. In accomplishing the second purpose, i.e. that of urging the actuator during amount entering operations, the spring 25 has the same function as that of the actuating spring normally urging the actuator for differential movement in conventional machines.

*Subtraction*

If the operation to be performed is a subtraction, prior to the shifting of the register the register cradle is rotated 180° about a central axis, in a known manner, whereupon the subtracting pinions 19 are put into engagement with the actuators 21. The register reversing mechanism may be of a known type and will not be described.

*Taking Totals*

For taking a positive total the register to be cleared is shifted to the left into engagement with the slides 5; if, on the contrary, the total is negative, prior to the shifting of the register the register cradle is rotated 180° about a central axis, in a known manner, whereupon the pinions 18 are put into engagement with the slides 5.

Furthermore, as is known in the art, prior to total taking the pin carriage 4 is shifted half step transversely to the machine, thereby permitting the projections 13 of slides 5 to pass between the teeth of the comb 46. Such a half-step shifting mechanism for the pin carriage is fully described, for example, in the U.S. Patent 1,707,303 to T. E. W. Greve, page 4, lines 101 to 119, in connection with the comb 94 (FIGS. 6, 18 and 19) and the projections 20 of the type carriers 19 (FIGS. 2 and 6).

During the forward stroke of the total taking cycle each slide 5 moves upwardly until the transfer tooth 20 of the register pinion engaging therewith is arrested by the stop lug 44′ of the stop plate 43. Therefore, at the end of the forward stroke the slides 5 assume the position corresponding to the total taken from the register and thereupon the type carriers 16 may print said total. At the end of the forward stroke the register is disengaged from the slides 5, as is known per se. However, if the total to be taken is a sub total, the register is held engaged also during the return stroke, as is well known in the art. During the return stroke the restoring bar 10 restores the slides 5 to normal.

In total taking, instead of being engaged by the actuators 21, the register to be cleared is put into engagement with the slides 5. It will thus be apparent that in a total taking cycle the register to be cleared may immediately engage the slides 5, because it is no longer necessary to allot a predetermined initial portion of the forward stroke of the machine cycle to the restoration of the actuators 21, which for purposes of transfer may have effected an additional downward travel from the position of FIG. 1, whereby the cycling speed of the machine may be further increased.

It may further be observed that in shifting the register to be cleared into engagement with the slides 5 the transfer teeth 20 are put into cooperation with the stop lugs of the fixed stop plates 43, thereby overcoming the known disadvantages first of having the register pinions arrested by the transfer pawls acting as zero stops, and second, having the stop plates shifted into engagement with the register pinions at each total taking cycle.

Finally, it will be apparent that in total taking the actuators 21 may be held locked in their position of rest of FIG. 2.

*Duplex Machine*

The machine, as above discussed, is provided with a second register designated as 17″. The transfer mechanism 35, 39, hereinabove described, may be utilized for the second register, and to this end, each lever 39 is provided with a second pawl, designated 41″. It may be observed that contrary to the operation conditions of the transfer teeth 20 of the two registers 17′ and 17″ are identical, irrespective of the pawl operated, the pawls 41′ and 41″ being arranged in such a manner with respect to the common fulcrum 40 that said transfer teeth act on the pawls with equal leverage. This may be gathered by FIG. 2, bearing in mined that the right hand pinion of each register rotates nine steps from the position of FIG. 2 before contacting the upper face of the pawls 41′ and 41″, respectively.

In total taking the transfer teeth of the lower register 17″ are arrested by the lower stop lug 44″ of the stop plate 43.

When operating with two registers, it is apparent from FIG. 2 that for entering into one register an amount cleared from the other register it is sufficient to engage the register to be cleared with the slides 5 while the other register is engaged with the actuators 21. In this case, during the forward stroke the slides 5 clear the register engaging therewith and assume the position corresponding to the total taken and during the return stroke the actuators 21, which have followed the displacement of the corresponding slides 5, enter said total into the other register.

A similar operation may be effected also on certain conventional machines, wherein two registers are engageable with the same set of actuators. However, if in said machine the actuators are movable an additional step for purposes of transfer, like the actuators 21, it is difficult to take a sub total from one register and at the same time transfer it into the other register, since the transfers which may occur in the second register during the return stroke disturb the first register still engaging with the actuators for the reentering of the sub total taken during the forward stroke.

This disadvantage is overcome with the present structure, since the transfer movements of the actuators 21 do not affect the slides 5.

*Duplex Machine Keyboard*

For facilitating the simultaneous depression of the function keys corresponding to different registers, said keys have been disposed according to the keyboard shown in FIG. 1. As above discussed, the adding and substracting keys, 51′ and 52′ respectively, for the register 17′ are grouped together with the total and sub total keys 49″ and 50″ respectively, for the register 17″. Similarly, the adding and subtracting keys 51″ and 52″ for the register 17″ are grouped with the total and sub total keys 49′ and 50′ for the register 17′.

*Pin Restoring Plate*

Although any suitable pin restoring plate may be used in cooperation with the pin carriage to restore the pins set in the same, as known to those skilled in the art, certain features of the restoring plate designed particularly for this machine shall now be disclosed.

As shown in FIG. 3, on a fixed shaft 207 is pivoted an arm 208 carrying a plate 209 juxtaposed to the pin carriage 4. As is known in the art, the plate 209 embraces all the pins 3 and 3′ of the pin carriage when in its normal position.

A cam 149 carried by the main operating shaft 45 is adapted to engage a lug 210 protruding from the arm 208, whereby the plate 209 is rocked counterclockwise and the pins 3 and 3′ thereupon encountered are restored into their normal position of FIG. 3. A spring 211 restores then the plate 209 into the position of FIG. 3.

It will be apparent that, if it is desired to disable the restoring plate 209, it is sufficient to displace the arm 208 along the shaft 207 until the lug 210 is brought out of the path of the cam 149.

*Printing Mechanism*

Although any suitable printing mechanism may be used in cooperation with the slides 5, certain features of the printing mechanism designed particularly for this machine are disclosed.

Referring again to FIG. 2, on each slide 5 is pivoted a rack 14 which is in mesh with a pinion 15 pivoted on a slide 83. A type wheel 16 is secured to the pinion 15. The slides 83 are horizontally movable on a slotted plate 88′. Each slide 83 is urged to the left by a spring 85 and is normally held in the position of FIG. 2 by a restoring bar 86 cooperating with a bent-over lug 84 projecting laterally from each slide 83. The restoring bar 86 is supported by two links 87 pivoted on the bail 11.

At each forward stroke of the shaft 12 the bar 86 is moved to the left and the slides 83 follow in this direction under the action of their springs 85. However, after a short travel each slide is arrested by a latch 96. Thereafter the latches 96 corresponding to the orders in which a digit is to be printed are lowered, thereby unlatching the respective slides 83, which move to the left and effect printing. The restoring bar 86 and the latches 96 are known per se, and their mode of operation will not be described.

On each slide 83 is secured a lug 97 which acts as a guide for the rack 14 for the purpose of maintaining it constantly in mesh with the corresponding pinion 15. It will thus be apparent that the type wheels 16 are constantly connected to their respective slides 5, with the result of a highly simplified and lighter construction.

*Type Wheels Alignment*

In the present machine the restoring bar 10 restores the slides 5 beyond their theoretical zero position an amount equal to the amount of the clearance left between the transfer tooth 20 and the corresponding stop lug of the stop plate 43. It is in this position of the slides 5, which is the normal position of FIG. 2, that the register to be cleared for total taking is put into engagement with the slides 5, whereby during the following forward stroke the type wheels 16 rotate an additional amount, before reaching their theoretical zero position, which is equal to the amount of the additional rotation accomplished by the register pinions due to the clearance cited. The total is, therefore, printed on the ordinary line of printing and this result is achieved without providing any extra aligning mechanism.

It may be observed that, due to the additional restoring movement of the slides 5 as described above, an equal clearance is left between the projections 13 and the teeth of the comb 46 thereby permitting the free transversal movement of the pin carriage 4.

*Non Printing*

The machine is provided with means, known per se, which disable the printing mechanism when desired. To this end a non print key 224 is provided on the keyboard shown in FIG. 1. According to the invention, the key 224, when shifted to the left into its operative position, enables an extra printing hammer to strike the paper for printing a special sign each time a non-printing cycle is effected, thereby enabling a check of the machine against intentional misuse.

The type for printing the special sign is carried by a three-armed lever, 226, pivotally mounted on a fixed shaft. The left hand arm of the lever 226 terminates with a bent-over lug normally disposed above the upper arm 229 of a three-armed lever 215 pivotally mounted on a fixed shaft. The lower arm of the lever 215 terminates with a roller engageable by a cam 218 secured to the main operating shaft 45. A spring 216 connected with the lever 226 tends to urge same in counterclockwise direction.

Normally, the lever 226 is arrested by a stud 227 fixed to the link 87. When the latter moves to the left, as described hereinabove, the lever 226 is free to rotate counterclockwise, until arrested by a projection of a plate 95 normally lying in the path of the lower arm of the lever 226, as shown in FIG. 4.

When the non-print key 224 is moved to the left, as viewed in FIG. 1, a slide 220 (see FIG. 4) connected thereto in a known manner not to be described, is shifted from its normal right hand position within a slot 219 of the plate 95. The plate 95, which is slidably mounted by means of a bar 212 fixed thereto in a slot 213 of the machine frame, is thereby shifted to the right, so that a recess 243 comes into the path of the lower arm of the lever 226.

Therefore, during a non print cycle the rotation of the lever 226 is not hindered by the plate 95 and the lever 226 rotates until its left hand arm is arrested by the upper arm 229 of the lever 215. When the cam 218 engages the roller of the lever 215 and rotates the lever 215 in clockwise direction, the upper arm 229 releases the lever 226 and the sign carried thereon is imprinted upon the paper.

Although a specific machine has been described, obviously, the invention is designed to have equal utility with any computing machine, and the invention should not be limited except as defined in the following claim.

What is claimed is:

A computer comprising a first register, a second register, means for selectively taking totals or subtotals from each of said registers, means for selectively entering addends or subtrahends into each of said registers, and means for effecting a total or subtotal operation in one of said registers concurrently with the entry of the total amount, additively or subtractively, in the other register, said last named means comprising a keyboard including a first amount entering key for entering an addend into said first register, a second amount entering key for entering a subtrahend into said first register, a first total taking key for taking a total from said first register, a second total taking key for taking a subtotal from said first register a third amount entering key for entering an addend into said second register, a fourth amount entering key for entering a subtrahend into said second register, a third total taking key for taking a total from said second register and a fourth total taking key for taking a subtotal from said second register, each of said keys being depressible and operable independently of any other key, said keys being arranged in four pairs in first and second groups, said first group comprising said first and second amount entering keys as the first pair, and said third and fourth total taking keys as the second pair, and said second group comprising said third and fourth amount entering keys as the third pair, and said first and second total taking keys as the fourth pair, the keys in said first group being arranged so that said first amount entering key is within a finger's width of said third and fourth total taking keys, and said second amount entering key is within a finger's width of said third and fourth total taking keys, and the keys in said second group being arranged so that said third amount entering key is within a finger's width of said first and second total taking keys and said fourth amount entering key is within a finger's width of said first and second total taking keys, one of said pairs of keys in each group lying between the opposite pair of keys in that group, wherein in each of said groups said opposite pair of keys are elongated so that an edge of each key of said opposite pair lies adjacent substantially an entire edge of both keys of said one pair.

References Cited in the file of this patent

UNITED STATES PATENTS

| | | |
|---|---|---|
| 2,531,206 | Gang | Nov. 21, 1950 |
| 2,629,549 | Butler | Feb. 24, 1953 |